United States Patent [19]
DeGroft

[11] 3,776,673
[45] Dec. 4, 1973

[54] APPARATUS FOR SECURING NIB IN PLASTIC WRITING INSTRUMENT

[75] Inventor: Walter J. DeGroft, Glen Ellyn, Ill.

[73] Assignee: Sanford Research Company, Bellwood, Ill.

[22] Filed: Sept. 27, 1971

[21] Appl. No.: 183,963

Related U.S. Application Data

[62] Division of Ser. No. 813,886, April 7, 1969, abandoned.

[52] U.S. Cl. .................... 425/125, 29/517, 425/392
[51] Int. Cl. ..................... B29c 27/14, B29c 27/30
[58] Field of Search.................. 425/392, 125, 127, 425/383, 384, 392, 117; 29/441 BP, 517, 33 M, 33 R

[56] References Cited
UNITED STATES PATENTS

| | | | |
|---|---|---|---|
| 2,791,137 | 5/1957 | Jones | 29/441 BP |
| 2,891,511 | 6/1959 | Fehling | 29/441 BP |
| 2,992,572 | 7/1961 | Lockart | 29/441 BP |
| 3,162,941 | 12/1964 | Young | 29/441 BP |
| 3,496,627 | 2/1970 | Mazzier et al. | 29/441 BP |

FOREIGN PATENTS OR APPLICATIONS

| | | | |
|---|---|---|---|
| 1,032,475 | 7/1953 | France | 29/441 BP |

Primary Examiner—Richard B. Lazarus
Attorney—Axel A. Hofgren et al.

[57] ABSTRACT

An apparatus for securing a wick-like nib in a plastic ferrule of a marking instrument which has a hollow body containing porous absorbent material for storing a quantity of ink. The apparatus deforms the outer end of the ferrule into positive gripping engagement with the nib by applied heat and pressure while maintaining the nib in contact with the absorbent material. The apparatus includes a multipurpose die, capable of reciprocation, which has a first portion for pushing the nib into the absorbent material and a second portion including a heating jacket with heated camming surfaces for engaging and softening the end of the plastic ferrule to force that end into gripping engagement with the nib as the first portion of the die maintains the nib in contact with the absorbent material.

7 Claims, 9 Drawing Figures

PATENTED DEC 4 1973

INVENTOR
Walter J. DeGroft

BY Hoffren, Wegner, Allen, Steelman & McCord
ATTORNEYS

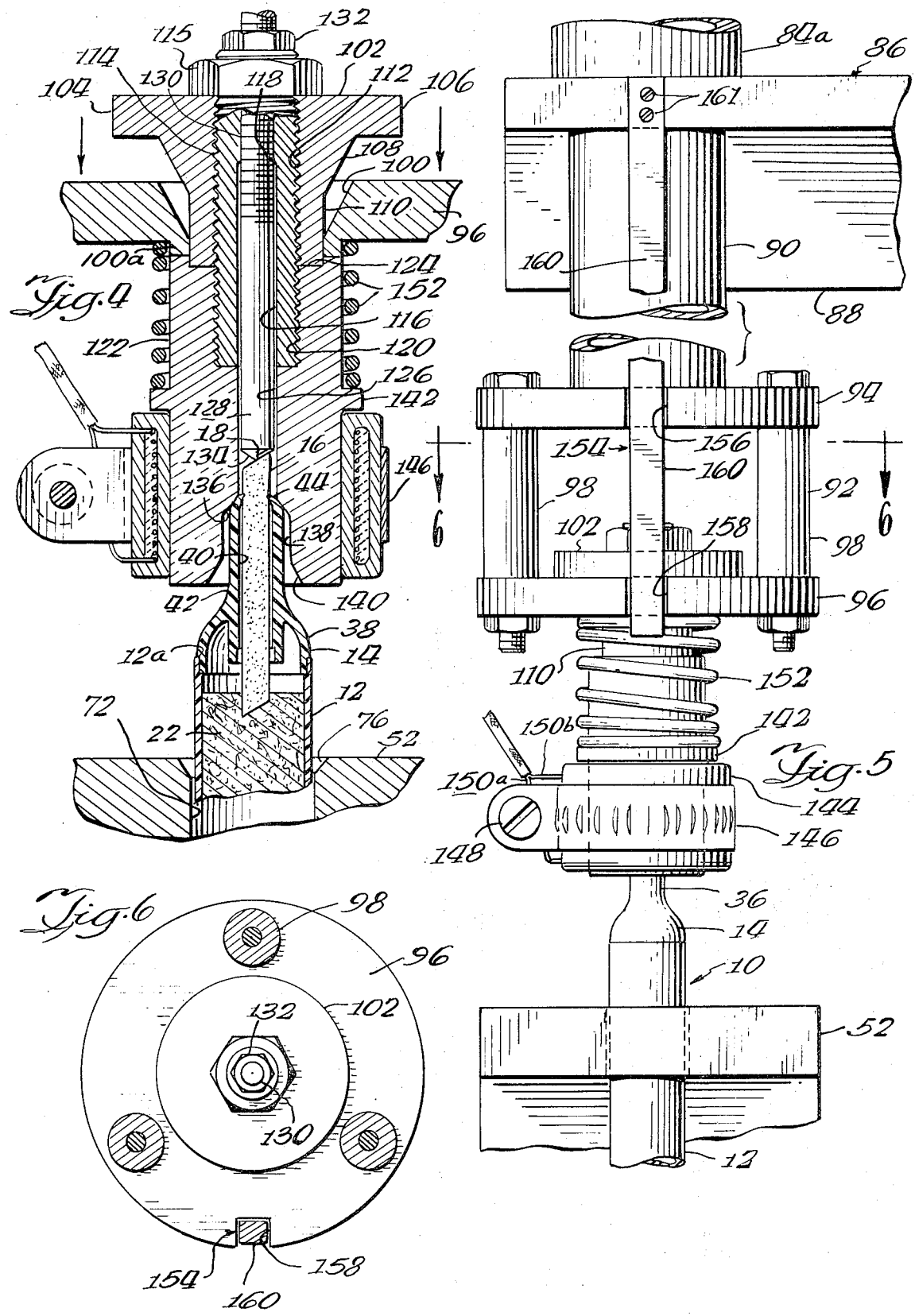

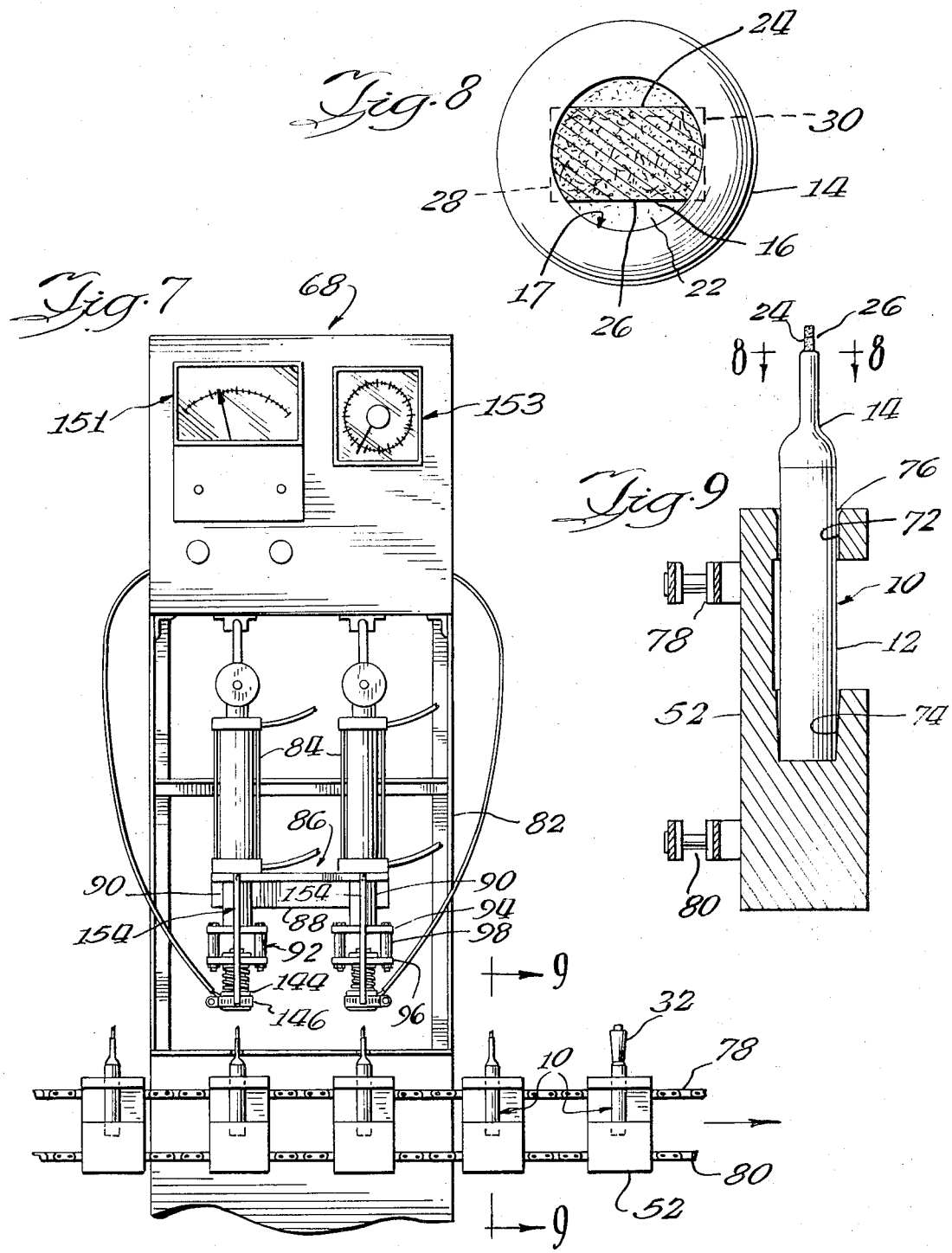

APPARATUS FOR SECURING NIB IN PLASTIC WRITING INSTRUMENT

RELATED APPLICATIONS

This application is a division of my copending application Ser. No. 813,886 entitled METHOD AND APPARATUS FOR SECURING NIB IN PLASTIC WRITING INSTRUMENT AND WRITING INSTRUMENT FORMED BY SUCH METHOD, filed Apr. 7, 1969 and now abandoned.

BACKGROUND OF THE INVENTION

1. Field of the Invention

This invention relates to an apparatus for forming marking instruments of the wick or felt tip type.

2. Brief Description of the Prior Art

In the art relating to felt tip marking instruments, one of the critical structural features is the manner of securement of the felt nib or tip in the ferrule of the marking instrument. Art known to the applicant relating to securement of felt tips in marking instruments includes the following:

| | |
|---|---|
| DeGroft | 2,392,840 |
| Swanson | 2,528,921 |
| Rosenthal | 2,713,176 |
| Rosenthal | 3,057,000 |
| Rosenthal | 3,069,767 |
| Stevens | 3,080,600 |
| Lofgren | 3,089,182 |
| Simon Jr. et al | 3,141,187 |
| Seeman | 3,221,360 |
| Kershaw | 3,230,574 |
| Lofgren | 3,231,924 |
| Ward | 3,278,976 |
| DeGroft | 3,345,674 |

Formerly, some felt tip marking instruments have been made with a felt body having a metallic, outwardly extending hollow, reduced, sleeve-like neck or ferrule. The felt tip was held in the ferrule by restrictions formed therein. Subsequently, marking instruments utilizing plastic ferrules and plastic bodies have come into use. In such instruments, the hollow interior of the ferrule had preformed annular restrictions or preformed radially inwardly directed ribs usually near the lower end of the ferrule. Assembly and securement of the felt tip to the ferrule was accomplished by forcing the tip past the restrictions and hopefully into contact with the absorbent material containing the ink supply. In some instances the felt nib was inserted and then twisted into frictional engagement with the restrictions (Seeman U.S. Pat. No. 3,221,360; Kershaw U.S. Pat. No. 3,230,574). Some felt tips were specially notched or cut to accommodate the restrictions, resulting in dimensional tolerance problems and in wasted felt material (Simon et al, U.S. Pat. No. 3,141,187).

The prior art arrangements for securing felt tips to the plastic ferrules of marking instruments presented many problems. As to manufacturing tolerances, both the felt tips and plastic ferrules vary in dimension so that tight securement of the tip in the sleeve-like ferrule did not always result. Many times the ribs or restrictions were formed well axially inwardly of the outer end of the ferrule so that the tip was supported far from its outer marking or working end, frequently resulting in twisting and flexing of the tip during use. Sometimes, the tips moved axially as well. Tips which were twisted into frictional engagement with camming ribs, as mentioned above, sometimes become loosened and capable of such unintended axial movement. In addition, the retention of the tip by means of spaced, inwardly directed ribs left a gap about the tip at the open end of the sleeve. This gap was not aesthetically pleasing and increased the likelihood of evaporation from the reservoir. Thus, a need and desire had arisen to provide an improved means for supporting and securing a felt tip in the plastic sleeve-like ferrule of a marking instrument and an improved apparatus for assembly. The present invention alleviates all of the above prior art deficiencies and problems.

SUMMARY OF THE INVENTION

This invention is directed to a new apparatus for positively securing a wick-like nib to the ferrule of a marking instrument.

The best mode currently contemplated by me for carrying out the invention includes the provision of an inwardly directed reduced diameter end at the open end of the ferrule which positively grips the tip and holds the same against displacement in any direction. Preferably, this is accomplished by providing a die having a hollow, frustoconical interior mounted on a biased universally adjustable mounting. A felt tip is inserted into a sleeve-like ferrule (which has no inner nib restrictions) and the inner dimensions of the sleeve or ferrule is of a size so as to freely receive and not bind upon the outer surface of the elongated felt nib. Following nib insertion, the die pushes the felt tip or nib into the absorbent material of the reservoir, and the die and the free or outer end of the ferrule are brought into engagement under heat and pressure to force and constrict the outer end annularly inwardly to grip and hold the outer end of the felt nib.

BRIEF DESCRIPTION OF THE DRAWINGS

FIG. 4 is a section view similar to FIG. 3 showing the die member in its fully extended downward position so that the inner end of the nib has penetrated into the absorbent ink storing material and the camming and heating surfaces are in contact (and forcing inwardly) the outer end of the ferrule.

FIG. 5 is a fragmentary enlarged elevational view of the die assembly at the heating and forming station;

FIG. 6 is a section view taken generally along the line 6—6 of FIG. 5;

FIG. 7 is a front elevational view of station showing apparatus.

FIG. 8 is a section view taken generally along the line 8—8 of FIG. 9 and generally showing a top plan view of the ferrule of a marking instrument made in accordance with this invention; and FIG. 9 is a section view taken generally along the line 9—9 of FIG. 7.

Figure 1:
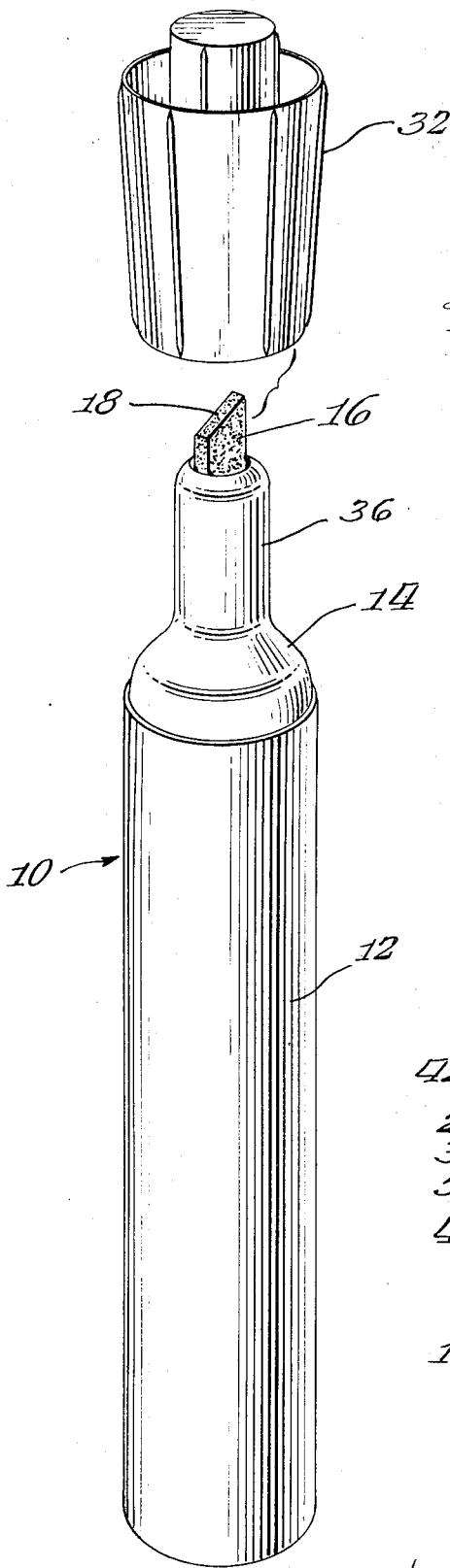
FIG. 1 is a perspective view of a marking instrument showing the cap removed for clarity of illustration.

While this invention is susceptible of embodiment in many different forms, there is shown in the drawings and will herein be described in detail, a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The marking device 10 of this invention includes a generally hollow cylindrical body or barrel 12 of a generally rigid, self-supporting material, such as a plastic. Body 12 terminates in an open end 12a, to which is connected a ferrule 14, preferably of styrene. The function of ferrule 14 is to embrace and support a writing or marking nib or element 16. Nib 16 has a free marking end or tip 18 and an inner absorbent end 20 intended for absorbent engagement with porous absorbent material 22, such as felt or cellulose, in the interior of body 12. Material 22 is saturated with a marking fluid, such as ink, so that body 12 and absorbent material 22 constitute an ink reservoir for the capillary flow of ink through the felt nib 16 to the marking end 18.

Nib 16 is preferably formed from an absorbent, self-supporting, generally semi-stiff material, such as dacron fiber felt. The felt is commercially available and is impregnated with resin to afford the semi-rigid characteristic. The nib is generally flat and elongate with two opposed flat faces 24 and 26 and opposed narrow sides 28 and 30. Preferably, both ends 18 and 20 are parallel to each other and are acutely angled relative to sides 28 and 30 to provide two end points for the nib and further permit either end to be inserted into the reservoir during assembly.

Ferrule 14 includes a reduced cylindrical sleeve-like neck 36, and an outwardly and downwardly flaring annular skirt 38. Neck 36 has generally concentric inner and outer walls 40 and 42, respectively, and is open at its upper and lower ends 44 and 46, respectively. The inner wall is preferably of cylindrical configuration and of a diameter slightly larger than the largest cross sectional dimension of nib 16 so that a nib 16 inserted through open upper end 44 will readily and freely pass through the sleeve-like interior of ferrule 14. Skirt 38 terminates in a reduced end 48 forming a radial shoulder 50. End 48 is of a size and shape to be snugly received and secured in the interior of the open end 12a of the body 12 and shoulder 50 limits the insertion of ferrule 14 into body 12 and abuts therewith.

The nib-securing station is illustrated in FIG. 7 which shows the marking instruments approaching the station from the left. At this time absorbent material 22 has been positioned in each body 12 of an advancing marking instrument; the ferrule 14 has been secured to the upper end of each body 12; each body has been filled with marking fluid; and a nib 16 has been inserted in each ferrule 14 so as to be positioned generally as shown in FIG. 3 with the inner end of the nib 16 merely resting on the upper surface of the absorbent material 22.

Preferably the marking instruments are supported upright in an assembly line by each being positioned in a marking instrument holder 52. The holders 52 are uniformly positioned upon the assembly line, and may each comprise a block-like element having upright aligned apertures 72 and 74 of a size and shape to loosely embrace the body of the marking instrument therein, as shown in FIG. 9. The upper end of aperture 72 may be slightly beveled as at 76 to assist in initially guiding the body 12 when it is placed in the holder 52. As best seen in FIG. 7, the holders 52 may be connected to a pair of parallel chains 78 and 80 for carrying them on the assembly line.

As further seen in FIG. 7, the nib-securing station includes a frame 82 which supports a pair of linear motion transmitting means, such as the air cylinders 84. These cylinders each include the usual linearly extensible rod 84a (FIG. 5) which is connected to a die frame assembly 86. Referring to FIGS. 5 and 7, the die frame 86 includes a cross member 88 bridging both rods 84a and supporting a pair of rod extensions 90 which are generally an axial extension of the piston rods 84a. Each rod extension 90 is connected to a die support 92 which includes upper and lower die support plates 94 and 96 secured together as a unit by a suitable spacer and bolt arrangement 98.

Figure 3:
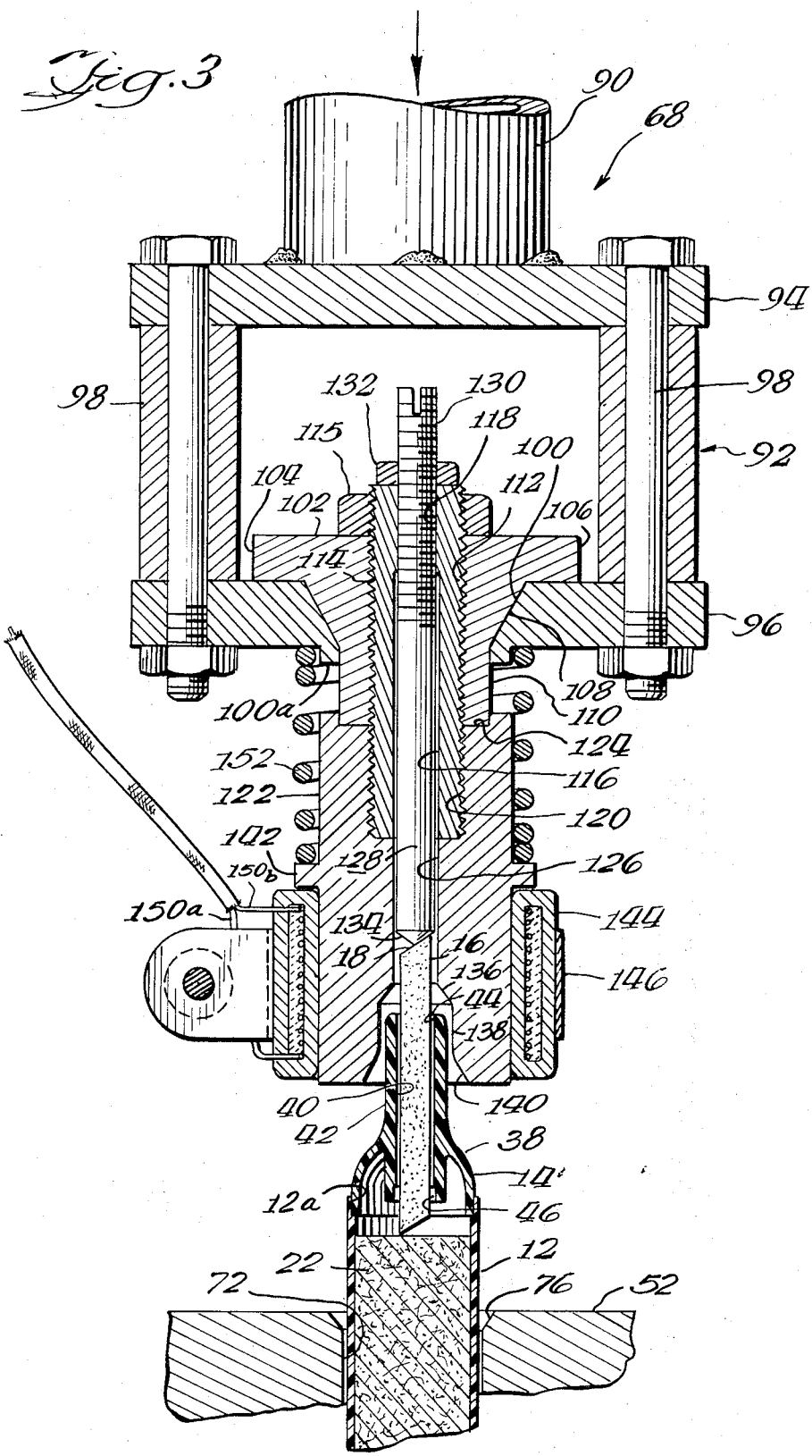
FIG. 3 is a fragmentary enlarged sectional view of a portion of the apparatus at the station wherein the method and operation of securing the nib to the plastic ferrule of a marking instrument is performed, the die being in its downward stroke so that the nib pushing element has started its contact with the nib.

As shown in FIGS. 3 and 5, lower die support plate 96 has a generally frusto-conical opening 100 formed centrally of support plate 96. This opening is generally of a size and shape to loosely, matingly receive a die hub member 102. Member 102 has radially extending upper portions 104 and 106 which rest upon the upper surface of plate 96, and also has a generally frusto-conically reduced bearing portion 108 which is received in the opening 100 in die plate 96. Bearing portion 108 terminates in a generally reduced circular cylindrical neck extension 110, that projects below plate 96 through the opening 100. Plate 96 has a short hub-like extension 100a surrounding the bottom of opening 100.

Member 102 has a threaded interior 112 for receiving the threaded exterior of die connector 114. A lock nut 115 secures die connector 114 in position in hub member 102. Die connector 114 has a hollow, cylindrical interior 116 with at least a portion at the upper end 118 being internally threaded. The lower end of die connector 114 is threadably received in the threaded interior 120 at the upper end of die element 122. The upper end of die 122 is also annularly recessed as at 124 to receive the exterior of reduced neck 110 of member 102. Below the threaded interior 120 of die 122, the die is provided with a reduced, generally circular cylindrical hollow bore 126 for receiving a nib push rod 128. Push rod 128 has a threaded upper end 130 for threaded engagement with the threaded upper interior portion 118 of die connector 114. A suitable lock nut 132 may be provided for fixing the rod 128 in a desired position of vertical adjustment relative to the vertical extent of the bores 126 and 116.

The lower end of push rod 128 is provided with a conical cap 134 having an exterior face complementary to the angular truncated end 18 of the nib 16. Bore 126 widens into a generally frusto-conical enlarged portion 136 which terminates in the generally enlarged circular cylindrical portion 138 which in turn opens through the bottom of die 122 in an outwardly and downwardly diverging portion 140. Portions 138 and 140 are intended to be of a size to be generally complementary relative to neck portion 42 and end portion 38, respectively, of the ferrule 14 (FIG. 3).

Die 122 has a radially extending shoulder 42 intermediate the ends thereof. Below the shoulder a suitable heating element 144 is secured thereto by well-known means, such as a clamp type fastening arrangement 146 secured together by a suitable screw and locking nut arrangement 148. Lead wires 150a and 150b extend from a source of current to the heating element 144 which envelopes and heats the lower end of the die 122.

Suitable regulatory means is provided to maintain the die at the desired temperature, and a temperature gauge 151 is provided in a panel above the air cylinders, as shown in FIG. 7, for the convenience of persons in charge of the nib-securing station. Dials 151a afford a ready means for temperature adjustment. Also, the time of engagement between the heated die and the upper end 44 of the ferrule 14 is capable of regulation by an adjustable time control 153 which regulates the timing of the upward, return stroke of the air cylinders.

A coil spring 152 is interposed between the bottom of plate 96 and shoulder 142 on die 122 and surrounds the hub-like extension 100a on plate 96 to provide a means for resiliently mounting the die relative to the die frame. This resilient mounting means together with the frusto-conical seat 100 in member 96 and the frusto-conical neck 108 on member 102 provides a means for affording slight universal movement or adjustment of the die as it seats relative to the ferrule of the marking instrument as will be explained later.

To maintain the movement of the die support in vertical alignment, a guide means 154 is provided for each die assembly, as best seen in FIGS. 5, 6 and 7. Each guide means 154 includes aligned peripheral recesses 156 and 158 (FIG. 5) in plates 94 and 96 and a rod 160 which extends through recesses 156 and 158 and is secured at 161 to die frame 86.

In operation, as the holders 52 are intermittently advanced in pairs to the nib-securing station, each holder of a pair is positioned generally in registration with the lower opening of one of the dies 122. Through suitable signal means (not shown) the cylinders 84 are actuated to cause linear extension of the rods 84a and downward movement of the die from 86 including the support 92. FIG. 3 shows the orientation of the die assembly relative to each of the marking instruments 12 at the initial engagement of the face of conical cap 134 of push rod 138 with the angular end face of nib 16. It can be seen in FIG. 3 that the surface of cap 134 contacts the upper end 18 of nib 16. Because cap 134 is a downwardly extending conical surface and angled to contact the end 18 of a nib along an entire element of that conical surface, there will always be firm and proper surface engagement between the end cap 134 of the push rod 128 and the end 18 of the nib 16 regardless of the axial angular orientation of the nib 16 within the opening 40 of the ferrule 14. Thus, no one need precisely position a nib in a ferrule prior to a nib-securing operation.

Figure 2:
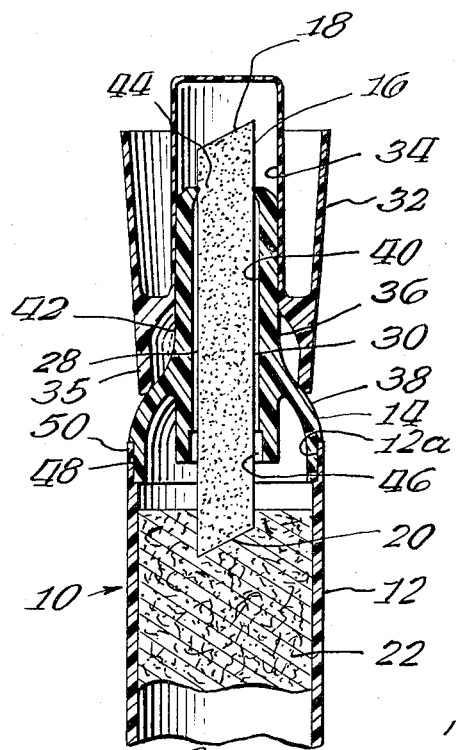
FIG. 2 is a fragmentary enlarged sectional view of the upper portion of a marking instrument (with cap closure) made in accordance with this invention.

Continued downward movement of the die assembly causes the nib 18 to be pushed into the absorbent reservoir 22, as shown in FIGS. 2 and 4, so that good capillary action is assured from the ink reservoir through the wick-like nib. Preferably the full cross section of the nib 16 at the end 20 penetrates the absorbent material 22 approximately one-sixteenth inch.

At about the same time as the nib 16 is pushed into and reaches its proper position in the marking instrument, the heated and downwardly diverging annular surface 136 of the die (FIG. 4) contacts the outer open end 44 of the ferrule 14. The temperature of the die is regulated so that sufficient heat is applied by the bevelled annular surface 136 to relax the plastic material at the contacted ferrule end 44; however, the temperature is so maintained, and the interval of time of contact between the die and plastic material is so maintained, that the plastic material does not melt from the applied heat. In other words, the plastic end 44 is preconditioned by the heat so that the plastic will be caused to flow where the camming surface 136 of the die contacts and forces or deforms the ferrule end 42 annularly inwardly (see FIG. 8) into positive and secure gripping engagement about the outer end of the nib 16.

As seen in FIG. 8, the heated plastic is generally more rigid than the resin impregnated nib 16, and thus the ferrule end portion 44 projects or indents into each of the four corners of the nib 16, while maintaining the air passage channels 15 and 17 on opposite sides of the nib 16 to the interior ink reservoir within the body of the marking instrument.

The temperature of applied heat, and the duration of time of the applied heat, of the die varies somewhat depending upon the kind of plastic, the amount of material to be heated, and also upon the color of the plastic, the darker color more readily absorbing heat. Operational settings by the inventor for his assignee have generally been found to be satisfactory with ferrules of styrene plastic in a broad range of colors (from dark to light) wherein the temperature is controlled within a range of 175°–200° Fahrenheit; the time of heat application is regulated between 1¾–1⅞ seconds; and the applied air pressure from the cylinders is maintained between 80–100 pounds. Styrene, being thermoplastic, cools and sets rapidly when heat (in the above temperature range) is removed.

The function of heated die surface 136 is best seen in FIG. 5 wherein the open end 44 of the ferrule 14 is annularly constricted to firmly grip and hold the nib 16 in position in the ferrule 14. During downward movement of the die, the spring 142 continues to be compressed until the hub extension 100a abuts the top of die 122. Following this, the element 102 may be lifted outwardly from its seating in the seat 100 of member 95 in opposition to the cushioning and restraining force of spring 152, as best seen in FIG. 5. In other words, slight lifting may occur as a result of die engagement with the end of the ferrule 14. This structual arrangement permits a slight universal tilting adjustment of the die relative to to the holders 52 and the marking instruments 12 therein. Thus, exact initial alignment of marking instruments 12 relative to the die 122 is not necessary because the die assembly will accommodate itself to slight misalignments of the holders and marking instruments.

With the structure of this invention the former assembly steps of forcing a nib past radially inwardly extending restrictions in the neck of a ferrule is eliminated. Thus, there is no need for a separate person to properly position and force the nibs past such preformed restrictions. Crimping or bevelling the outer end of the ferrule in the manner disclosed by this invention securely holds the nib against lateral and axial displacement, and, furthermore, the holding action is accomplished near the marking end of the nib to afford a more comfortable and more controllable marking instrument. Good contact is insured between the nib and reservoir in that the nib may be initially freely inserted through the neck of the ferrule without meeting any restrictions and, because of the securement of the nib near its writing end, the nib will not buckle. Air passageways or breathing passageways are maintained through the ferrule to the ink reservoir; however, their reduced size (as shown in FIG. 8) desirably retards the evaporation of the volatile ink within the marking instrument.

Generally speaking, manufacturing tolerances are such that the sizes of the nibs and the sizes of the ferrules will vary within a limited dimensional range. However, this variance is obviated by the structure of this invention in that the crimping of the top of the ferrule will securely lock the nib at that point without respect to such variances and tolerances.

To protect nib 16 during periods of non-use, a cap 32 is provided which is preferably formed from a soft plastic such as polypropylene. Cap 32 has an inner sleeve 34 of a size and shape to matingly snugly embrace the neck of the ferrule 14 during assembly. Preferably the soft plastic sleeve 34 is made slightly undersize in diameter in relation to the diameter of the ferrule neck 36 which is of harder styrene plastic, and the bevels on the free end 44 of the ferrule 14 afford a camming action for snug embrace of the neck by the cap. The depending annular skirt 35, being of soft plastic, may be made to resiliently conform to the contour of the flaring skirt portion 38 of the ferrule 14 so as to augment the excellent seal afforded the nib 16 when the cap 32 is on the marking instrument.

The die structure utilized to produce the marking instrument in accordance with this invention has the feature of being slightly universally tiltable or adjustable in its mounting structure, and further has the feature of being able to afford a proper pushing action on the writing end of the nib regardless of the circumferential orientation of the nib in the sleeve-like ferrule while at the same time securing the nib to the ferrule.

The foregoing detailed description has been given for clearness of understanding only, and no unnecessary limitations should be understood therefrom, as some modifications may be obvious to those skilled in the art.

I claim:

1. A device for securing a wick-like nib to the plastic ferrule of a marking instrument having a hollow ink-storing body containing a mass of porous absorbent material, comprising: a holder for the body of the marking instrument formed to support said body in a pre-selected position with the ferrule exposed and the nib slidably fitting within the ferrule with an end portion of the nib extending outwardly of the ferrule; a die member having a cavity formed and positioned to receive the ferrule and the outwardly extending end portion of the nib, the die member adjacent the cavity having a first portion for contacting the nibe end portion and a second portion for contacting the outer end of the ferrule, the first and second portions being positioned relative to each other so that during movement of the die member towards the holder, the first portion will push the nib inwardly of the ferrule into engagement with the mass of absorbent material and the second portion will contact the outer end of the ferrule; means for mounting the die member for movement toward and away from the holder; and means for heating the second portion of the die member to a temperature sufficient to soften the plastic ferrule end portion, whereby contact of the second portion of the die member with the ferrule outer end will soften and deform said outer end inwardly into gripping engagement with the nib end portion.

2. The device as specified in claim 1 in which the second portion of the die member includes a bevelled annular surface for contacting the ferrule outer end, said bevelled surface heating and softening said ferrule outer end and then forcing said outer end annularly inwardly into gripping engagement with the nib end portion during die member movement toward the holder.

3. The device as specified in claim 1 in which the second portion of the die member includes a camming surface for contacting the ferrule outer end; said camming surface heating and softening said ferrule outer end and then forcing at least opposed portions of said outer end inwardly into gripping engagement with the nib end portion during die member movement toward the holder.

4. The device as specified in claim 1 in which the first portion of the die member includes a projecting conical face formed to engage the angled nib end portion in pushing the nib a predetermined distance into contact with the absorbent material.

5. The device as specified in claim 1 in which the cavity in the die member has a widening mouth to receive and guide the nib and ferrule toward the first and second portions of the die member.

6. The device as specified in claim 1 in which the die member is resiliently mounted for slight tiltable movement upon the mounting means to assist in directing an off-center ferrule and nib toward the first and second portions of the die member.

7. The device as specified in claim 1, in which guide members are provided on the mounting means for guiding the die member toward and away from the holder.

* * * * *